United States Patent [19]

Bakka

[11] Patent Number: 4,939,719

[45] Date of Patent: Jul. 3, 1990

[54] MANAGEMENT UNIT FOR A UNIT FOR SWITCHING DATA TRANSMITTED BY ASYNCHRONOUS TIME-DIVISION MULTIPLEXING

[75] Inventor: Raymond Bakka, Meudon, France

[73] Assignee: Societe Anonyme dite : Alcatel Cit, Paris, France

[21] Appl. No.: 276,755

[22] Filed: Nov. 28, 1988

[30] Foreign Application Priority Data

Nov. 27, 1987 [FR]  France ............................ 87 16476

[51] Int. Cl.$^5$ .......................................... H04Q 11/04
[52] U.S. Cl. ..................................................... 370/60
[58] Field of Search ..................... 370/60, 94, 68, 58, 370/66, 67, 91, 60.1, 94.1, 58.1, 58.2, 58.3

[56] References Cited

U.S. PATENT DOCUMENTS

| 4,512,014 | 4/1985 | Binz et al. ........................ | 370/68 |
| 4,520,479 | 5/1985 | Grima et al. ...................... | 370/68 |
| 4,759,012 | 7/1988 | Suzuki ............................... | 370/68 |
| 4,788,679 | 11/1988 | Kataoka et al. .................. | 370/60 |
| 4,823,312 | 4/1989 | Michael et al. .................. | 370/94 |

FOREIGN PATENT DOCUMENTS

| 2526613 | 10/1983 | France . |
| 0113639 | 7/1984 | France . |
| 0251965 | 1/1988 | France . |
| 0264798 | 11/1987 | Japan ................................ 370/68 |

OTHER PUBLICATIONS

L'Echo des Recherches, No. 115, 1984, pp. 33–40, Issy-les-Moulineaux, FR.
M. Servel et al.: "Reseaux de Transfert en Videocommunication-La Commutation de Paquets", p. 34, colonne de droite, ligne 3-fini p. 38.

*Primary Examiner*—Douglas W. Olms
*Assistant Examiner*—Alpus H. Hsu
*Attorney, Agent, or Firm*—Sughrue, Mion, Zinn, Macpeak & Seas

[57] ABSTRACT

A management unit for a unit for switching data transmitted by asynchronous time-division multiplexing. It comprises input circuits (gme, gpe) adapted to receive cells present on the input bus (BE) of the switching unit and output circuits (grs, grv) adapted to supply cells on the output bus (BS) of the switching unit. The input circuits comprise a call circuit (gpe) detecting a call signal (adl) from the switching unit and commanding the writing of the cell present on the input bus (BE) into an input memory (gme). The output circuits comprise a transmit circuit (gpl) receiving an availability signal (fv) and determining the transmission of the cell that an output register (grs, grv) contains on the output bus (BS).

7 Claims, 4 Drawing Sheets

MANAGEMENT UNIT FOR A UNIT FOR SWITCHING DATA TRANSMITTED BY ASYNCHRONOUS TIME-DIVISION MULTIPLEXING

This application relates to Application Ser. No. 07/277,599 to Raymond Bakka entitled "A MANAGEMENT UNIT FOR A UNIT FOR SWITCHING DATA TRANSMITTED BY ASYNCHRONOUS TIME-DIVISION MULTIPLEXING" filed Nov. 28, 1988, and assigned to the common corporate Assignee.

BACKGROUND OF THE INVENTION

The present invention concerns a management unit for a unit for switching data transmitted by asynchronous time-division multiplexing known as an ATD (Asynchronous Time Division) switching matrix. In this context the term "data" is to be understood in its widest sense encompassing information comprising speech, pictures and all kinds of data in the usual sense to be transmitted and switched through the integrated services digital network (ISDN).

In asynchronous time-division (ATD) transmission as understood in this context, the transmission medium of a transmission link is temporally divided into equal intervals each conveying one cell, meaning a group comprising a specific number of binary information units or bits, including a label containing a destination indication and a data field containing the communication information proper. The data rates of the tranmission link on current projects is in the order of several 100 megabits per second.

Switching consists in receiving digital information structured in this way from several input links and retransmitting the information on several output links. To be more precise, a cell received on one of the input links is retransmitted on one of the output links as designated by the destination indication contained in the cell.

A switching unit is a unitary device implementing switching of this kind between a defined number of input links and a defined number of output links. Switching units of this kind may be combined into a multistage switching network. In this case the destination indication must meet the requirements of each of the switching units passed through.

At a switching unit and in a stationary switching state the cells from one input link intended for the same output link constitute a data stream the average data rate of which is constant but the instantaneous data rate of which is subject to fluctuations that may be regarded as random. The cells retransmitted on an output link originate from several input links and represent the addition of several independent streams. The network control means must be such that the average data rate corresponding to this addition is at most equal to the transmission capacity of the output link if congestion is to be avoided. For reasons of efficiency, however, this average total data rate must also be able to approach as closely as possible the nominal transmission capacity of the link. This means that the sum of the instantaneous data rates will from time to time exceed the transmission capacity of the output link. Outside these peak periods this capacity will not be fully utilized.

Within a switching unit, the foregoing considerations lead to the provision of a buffer memory receiving the cells from the input links and storing them until they can be retransmitted on the output links.

A switching unit meeting the requirement as just defined is the subject of the French Pat. No. 2 538 976. This describes a switching unit for data transmitted by ATD multiplexing comprising receive circuits each associated with an input link and supplying cells received by that input link, transmit circuits each associated with an output link and sending retransmitted cells on that output link, a buffer memory storing received cells supplied by the receive circuits and delivering cells to be retransmitted to the transmit circuits, and a buffer memory addressing device including a write address source and a read address source.

On the receiving side, the received cells appear on an input bus leading to the buffer memory into which the received cells from the various input links are written cyclically. In parallel with this, the label of each cell is analysed by means of a control memory and supplies the address of the output link for which the cell is intended. This address designates a "first in—first out" (FIFO) memory associated with the output link. It makes it possible to write into the latter the address of the buffer memory location in which the cell in question has been written. The output FIFO memory of each output link therefore indicates where the cells to be retransmitted on that output link are to be read out from the buffer memory.

On the transmitting side, the output FIFO are interrogated cyclically. Each of them supplies, if it is not empty, the address of the location in the buffer memory in which is waiting the cell received longest ago and which is to be retransmitted on the associated output link. The buffer memory is read at this address. The cell read is supplied on an output bus and is fed to a transmit circuit by which it is transmitted on the output link.

The copending U.S. Pat. application No. 07/277,599 filed this day by the applicant under the title "Unit For Switching Data Transmitted By Asynchronous Time-Division Multiplexing" is directed to improving the efficiency of use of the buffer memory in a switching unit of the type that has just been described so that the size of the switching unit can be reduced or its performance can be improved.

The invention is based on the fact that among the cells transmitted on an output link, which is also an input link of a later switching stage, there are cells that must not or cannot be retransmitted. Most of these are "empty" cells. As already explained, outside peak periods the nominal transmission capacity for an output link is not filled by the sum of the data streams applied to it. There are therefore cells for which, initially, there is no communication information available. These cells are then filled with a configuration of bits which is highly unlikely to be reproduced by any communication cell. The benefit of transmitting empty cells of this kind is that it enables synchronization of the receive circuit with regard to the temporal subdivision into separate time intervals.

It is therefore proposed that the switching unit comprises a write disabling circuit conditioned by the contents of a receive cell or by the absence of any receive cell and supplying a disabling signal and in that the address source includes a disable port conditioned by said disabling signal whereby no memory location is then occupied in the buffer memory.

The address source may be a counter supplying the successive writing addresses in the buffer memory and the disabling circuits will then prevent incrementing of the counter, avoiding the use of a write location in the buffer memory.

The address source may include a memory storing addresses of buffer memory locations released by cells already retransmitted. Said disabling signal will then prevent the reading of an address in this address store, which will advantageously be a FIFO memory.

Cells not to be retransmitted will be identified in particular by a circuit for decoding the address part of the label. Identification may also be done by the receive circuit where it does not have any communication cell to supply, because it has received an empty cell or because a received cell is not ready at the time it should supply one or because the receive circuit is not functioning normally (desynchronized or out of order, for example).

These provisions also apply if the routing is of the self-directed type, in which case the label of each cell to be routed includes destination indications for each of the switching units to be passed through, or the virtual circuit type, in which case the destination indication included in the label of each cell to be routed has to be translated in each switching unit passed through.

The present invention is directed to providing an unit for switching data transmitted by asynchronous time-division multiplexing of the type described in the two documents mentioned with a management unit adapted to communicate with the input links and the output links of the switching unit even if the switching unit is faulty.

Generally speaking, a management unit of this kind is a logic device collecting information in the switching unit and receiving information on its input links to supply control signals to the switching unit and information on its output links.

A conventional way of connecting a management unit of this kind is to connect it to an output and to an input of the switching unit. It will immediately be understood that if the switching unit is faulty the management unit is deprived of access to the input and output links of the switching unit. Thus it cannot even send a message indicating the failure. Also, the management unit cannot communicate with the switching unit itself except through circuits installed specifically for this purpose and extending into the switching unit, which at the very least implies additional cost. This will be the case where the management unit has to supply information relating to traffic on the input and output links of the switching unit.

What is more, the documents FR-A- No. 2 526 613 and EP-A- No. 0 251 965 both describe a packet (or cell) switch comprising a control unit connected to the input bus and to the output bus of a switching matrix. However, in both cases it is a control unit intervening in the functioning of the switching matrix and which consequently has to receive all the cells appearing on the input bus or which must on its own initiative transmit cells on the output bus. Given these conditions, the input and output circuits of the management unit have to cater for the very high data rate of the cells on these buses, which makes them expensive or imposes a limit on this data rate.

The invention concerns a management unit which does not suffer any such penalty.

SUMMARY OF THE INVENTION

An object of the invention is therefore a management unit comprising input means adapted to receive cells present on the input bus of the switching unit and output means adapted to supply cells to the output bus of the switching unit, in both cases under the control of the switching unit.

A management unit designed in this way connected to the input bus and to the output bus of the switching unit therefore communicates directly with the receive circuits of the input links and with the transmit circuits of the output links, without being dependent on correct functioning of the switching unit.

Said input means will preferably comprise a call circuit detecting a call signal from the switching unit and an input memory, the call signal commanding writing of the cell present on the input bus of the switching unit into the input memory of the management unit. This input memory will preferably be a FIFO memory capable of storing several cells.

Said output means will preferably comprise a transmit circuit detecting the absence of any cell to transmit in the switching unit and an output register, the transmit circuit then supplying the cell that the output register contains to the output bus of the switching unit.

Means of this kind will enable selective access by the management unit to the input and output buses, which will reduce the load on the management unit.

Furthermore, according to an additional characteristic of the invention, the management unit will comprise a forcing circuit preventing retransmission of a cell in the switching unit to enable transmission of the cell contained in the output register of the management unit. In this way the latter can benefit from routing priority.

The management unit will advantageously comprise a microprocessor and its memories together with a dedicated interface including in particular the input FIFO memory and the output register which will access the data bus of the microprocessor through multiplexing and demultiplexing means.

The management unit will further comprise write and read mode access means to a virtual circuit memory of the switching unit.

BRIEF DESCRIPTION OF THE INVENTION

The various objects and characteristics of the invention will emerge from the following description given by way of non-limiting example with reference to the appended drawing in which:

FIG. 1 is a simplified diagram of one embodiment of a switching unit that can be provided with the management unit in accordance with the present invention, FIG. 2 shows the format of a cell, FIG. 3 shows waveform diagrams of the various timebase signals used in the switching unit from FIG. 1, FIG. 4 is a diagram showing an alternative embodiment of the switching unit from FIG. 1, and FIG. 5 is a diagram showing the circuitry of one embodiment of the management unit in accordance with the invention.

DETAILED DESCRIPTION OF THE INVENTION

Figure 1:
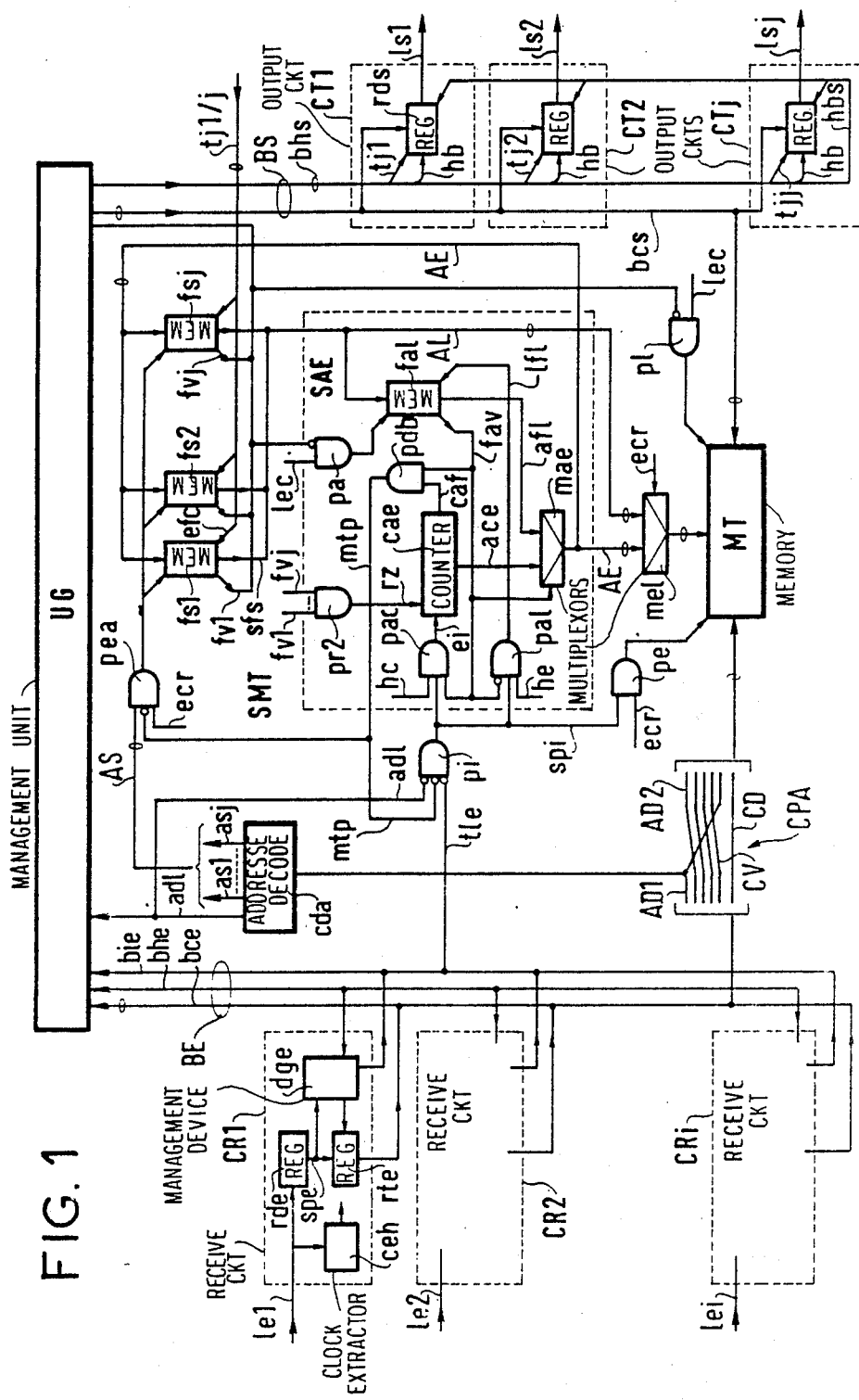

FIG. 1 is a simplified diagram of one embodiment of the switching unit that can be fitted with a management unit in accordance with the invention, that is to say an ATD switching matrix, in the case of self-directed type routing.

This matrix includes i similar receive circuits CR1 through CRi to each of which is connected one of i input links le1 through lei. The circuit CR1 is shown in simplified form and the circuits CR2 and CRi are shown in symbolic form, to avoid overcomplicating the diagram.

The receive circuit CR1 includes a clock extractor circuit ceh which produces a clock signal synchronized with the signals received on the link le1 and makes it possible, among other things, to detect the digital signals present on the link le1 in order to feed them serially into an input shift register rde. This input shift register is capable of holding an entire transmission cell and of supplying it in parallel from its output spe to an input buffer register rte which may be of the FIFO type. The receive circuit CR1 also includes an input management device dge which receives the cells provided in parallel at the output of the register rde which controls the input buffer register rte and which, among other things, enables it to be read. To this end the management device dqe is connected to an input clock bus bhe which supplies it with control signals and to an input information bus bie over which it supplies information signals. The input buffer register rte is connected to an input cell bus bce.

The three buses bhe, bie and bce together constitute the input bus BE. The bus BE is temporally shared between the receive circuits in a cycle CE the duration of which is at most that required to transmit one cell over the input links and which includes i equal periods ti individually referenced ti1 through tii (see FIG. 3), one for each of the receive circuits CR1 through CRi.

The functions of the management device dge include that of recognizing the periods in which no cell is applied by the receive circuit CR1 to the bus bce and to signal them as being of this kind by applying a free time signal to the line tle of the bus bhe.

The buffer memory system SMT therefore receives in each period ti either a cell CL received from a received circuit CR or a free time signal tle.

Figure 2:
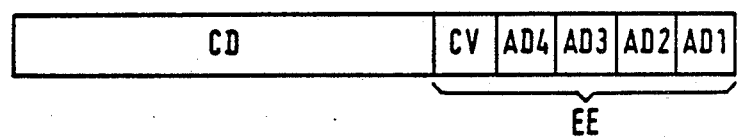

FIG. 2 shows the format of a cell CL. The cell comprises a data field CD and a label EE comprising, for example, four addresses AD1 through AD4 and an assignment number CV. The data field may comprise 32 bytes. The first address AD1 is that which is to provide a destination indication to the matrix in question. The subsequent addresses are to be used in the matrices through which the cell in question will pass subsequently. The assignment number CV has a similar role in relation to the network terminal equipment which will ultimately receive the cell and have to route it. As the matrices of a network are all similar, each has to receive a destination indication given by the first address of the label EE of the cell that it receives. For this to be so, the present matrix comprises address permutation wiring CPA between the bus bce and the buffer memory MT by means of which the address AD1 goes to the last position in the label EE and the addresses AD2 through AD4 and CV move forward one position. After retransmission of the cell the address AD2 will therefore be the address AD1 for a matrix of the next stage of a network of matrices such as that of FIG. 1.

As can be seen in FIG. 1, the address AD1 is transmitted to an address decoding circuit cda. This responds by supplying a signal on one of j output address lines AS individually referenced as1 through asj if the cell has to be retransmitted and this then identifies the output link on which it must be retransmitted. In the case of a cell which does not have to be retransmitted, for example in the case of a cell addressed to the management unit UG of this matrix, the decoding circuit supplies instead a signal on the line adl.

It will initially be assumed that the received cell CL is a communication cell that has to be retransmitted on one of the output links ls1 through lsj. The address decoding circuit cda therefore supplies a signal on the line asj, for example. It does not supply the signal adl. The signal tle is also absent.

It will also be assumed that a signal ntp is absent, which is true provided that the buffer memory is able to store an input cell, as will be seen later.

It is necessary to point out here that in the present text and for reasons of simplification the same reference is often used for a line and for the signal that it carries.

The consequence of what has been explained above is that the disabling gate pi, which is a NAND gate, supplies a signal spi enabling the gates pal and pac whereby a new write address source SAE write address is obtained. The write address source SAE essentially comprises an address memory fal, advantageously of the FIFO type, containing the addresses of write locations in the buffer memory MT which have just been released after use and an address counter cae having as many useful count states as the buffer comprises memory locations and which is incremented from one state to the next until it reaches a stop state in which it supplies a signal caf; all this will be explained later.

Provided that at least one address is stored in the FIFO fal, an output of this FIFO supplies a null level signal on a line fav which opens the gate pal and closes a gate pdb which then supplies a null signal opening the gate pi and the gate pea.

In the address obtaining time interval characterized by a signal he situated at the beginning of the period ti (see FIG. 3) the gate pal is open and supplies a signal lf1 to the FIFO fal instigating in the latter a read operation which delivers the address of a free location in the buffer memory MT on the lines afl. This address is fed to a multiplexer mae which also receives the null level signal on the line fav. The multiplexer mae responds by supplying the address AE.

The time interval in which the buffer memory MT is written is characterized by a signal ecr situated at the end of the period ti (see FIG. 3) and fed to a write/read address multiplexer mel to switch it to the write address source SAE; this supplies the address AE to the buffer memory MT.

At the same time the write control gate pe, also enabled by the output signal spi from the gate pi, transmits the signal ecr to the buffer memory MT in which a write operation is then performed. The cell present on the bus BE, as modified by the permutation wiring CPA, is written into a free location designated by the address AE.

Also, the same write signal ecr opens the gates pea so that the one which receives the signal asj from the decoding circuit cda supplies a write control signal to one of the j output FIFO fs1 through fsj each associated with a respective output link ls1 through lsj. The FIFO which corresponds to the output link for which the received cell is intended therefore receives the address AE of the location at which the cell is stored in the buffer memory MT, applied to the input of all the FIFO fs1 through fsj; it stores it for future retransmission of the cell in question on the corresponding output link.

The process as just described is reproduced in each period ti for successive receive circuits provided that the latter supply cells CL to be retransmitted and that the FIFO fal contains at least one available buffer memory location address.

If the FIFO fal does not contain any further address the level of the signal fav changes which closes the gate pal and opens the gate pac. It will be assumed that at this time the address counter cae has not reached the stop state in which it supplies the signal caf. Because of this the gate pdb supplies a null level signal mtp, as previously.

The signal fav when high switches the multiplexer mae to the output ace of the counter cae. It is therefore the address supplied by the counter cae that will be used to constitute the address AE instead of the address supplied by the FIFO fal. As previously, this address is used to write the incoming cell into the buffer memory MT. It is also written into the output FIFO fsl through fsj corresponding to the output link for which this cell is intended.

The signal hc is then retransmitted by the gate pac to an indexing input ei of the write address counter cae which is incremented by one step and supplies an address increased by one unit on its output ace, anticipating the writing of the next cell, unless it reaches the stop state.

This explains how the communication cells that have to be retransmitted are written into the buffer memory while the addresses of the memory locations which contain them are written into the output FIFO.

It is also necessary to consider the case where no address is available for writing in the buffer memory. This is case when the FIFO fal supplies the signal fav and the counter cae supplies the signal caf. The gate pdb responds by supplying the signal mtp which closes the gate pi and the gates pea. An incoming cell which cannot be written into the buffer memory is therefore treated as an empty cell. Its content is los, which is inevitable, but this does not disrupt the operations in progress.

A way must be provided for the counter cae to leave its stop state from time to time. This can be achieved as shown in FIG. 1, for example, using an AND gate prz which supplies a signal rz if all the output FIFO are empty and respectively supply the signals fvl through fvj. This signal reinitializes the counter cae after which it will supply the successive addresses of all the memory locations of the buffer memory MT as and when needed, in the manner previously described. The same signal can also reinitialize FIFO fal or ensure in some other way that the addresses which it contained are not used.

The case of a cell that is not to be retransmitted will now be considered. This case will first be illustrated by the reception of a cell intended for the management unit UG. This cell carries an address AD1 which when decoded by the decoding circuit cda causes a signal to be applied to the line adl, no signal being provided on the lines AS, on the other hand.

The bus BE is extended as far as the management unit UG. The line adl is also extended as far as the management unit UG. The decoding signal applied to this line will therefore invite the management unit UG to take notice of the information present on the bus BE. This procures the advantage that the management unit UG will only be called on to take notice of cells addressed to it, which will minimize its workload.

A second case, actually similar to the previous one, results from the reception of an "empty" cell by a receive circuit CR. For example, the matrix of the switching stage on the upstream side of the present matrix has no information to transmit in the cell to be transmitted on the link lel to the receive circuit CR1. It therefore sends an empty cell, as explained in the preamble to this description. The empty cell is identified by the management device dge when it is shown at the output spe of the register rde. This cell is not then transferred into the input buffer register rte. The result a little later, during a period of the bus BE assigned to the link lel, is that the register rte is empty; no cell is supplied on the bus bce and the management device dge delivers a signal tle on the bus bie. This signal notifies the management unit of this fact.

In the two typical cases that have just been described there is no need to prepare for retransmission of a receive cell. The invention therefore provides means of not occupying—uselessly—a location in the buffer memory MT. In practise there are various ways to achieve this result, depending on the configuration of the buffer memory addressing circuit. The simplest, which is that employed in this embodiment, is to disable operations relating to writing a cell into the buffer memory.

To this end the gate pi is closed by one or other of the signals adl and tle and supplies a disabling signal spi on the disabling ports of the gates pac and pal so that these two gates are closed. Because these gates remain closed the FIFO fal cannot be read and the counter cae cannot advance. Also, the disabling signal spi closes the gate pe so that the write operation will not take place in the buffer memory MT. Furthermore, the address decoding circuit cda does not supply any signal on the lines AS and therefore no address AE will be stored in the output FIFO fsl through fsj.

This avoids occupying a location in the buffer memory MT which increases the efficiency of the switching unit (if the memory capacity is unchanged relative to the prior art methods) or enables the capacity of the buffer memory to be reduced (for equal performance).

What is more, as no address is written into the output FIFO this will sooner or later result in the sending of an empty cell, as will emerge later.

Consideration will now be given as to how the stored cells are retransmitted on the output links.

Figure 3:
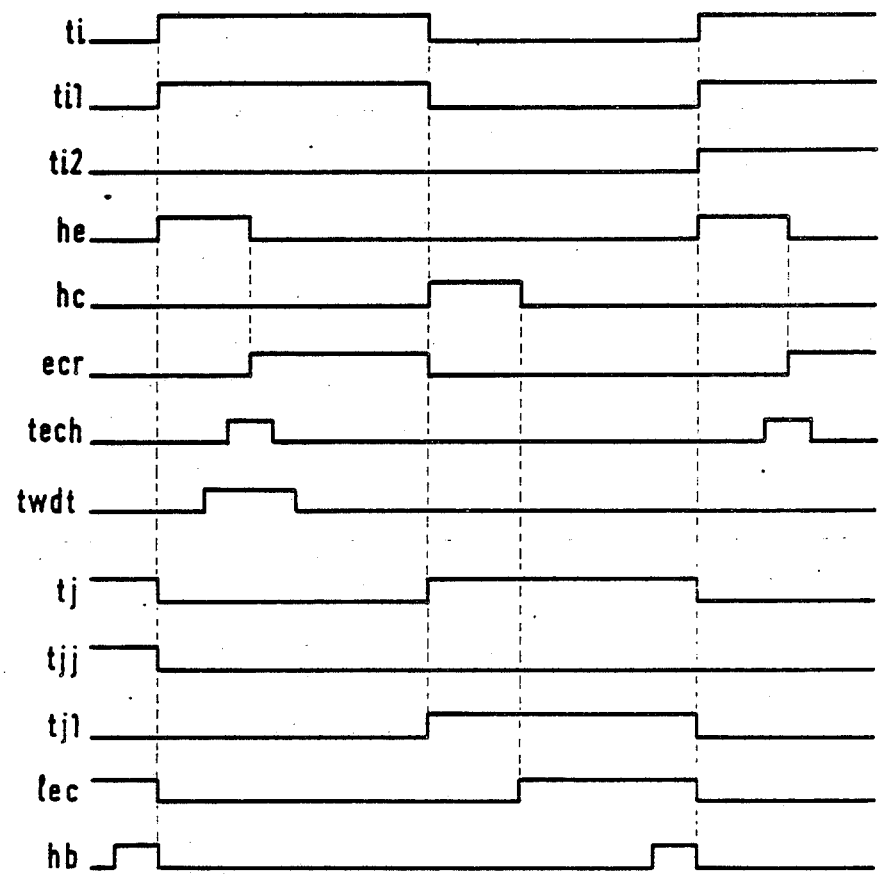

Each of the output links lsl through lsj is provided with an output circuit ctl through ctj which is equivalent to a parallel-serial conversion register rds. These output circuits CT are connected to a bus BS temporarily shared between all the output circuits in a cycle CS the duration of which is that to transmit a cell on the output link and which comprises j equal periods tj, individually referenced tjl through tjj (FIG. 3). This bus BS, similar to the input bus BE, comprises an output cell bus bcs and an output clock bus bhs. During a period defined by a signal tjl through tjj which is specific to it an output circuit (CT1, for example) loads into its register rds the cell then present on the bus bcs, under the control of the clock signal hs (see FIG. 3). From this time, and in response to clock pulses hbs, the entire cell is transferred serially from the register rds over the link lsl. The same applies for the other output links.

Cells are supplied to each of the output links by reading them in the buffer MT, provided that there are cells to be retransmitted.

At the beginning of a period tj one of the output FIFO fsl through fsj (fsl, for example), receiving a signal tjl specific to it on its read control input efc, supplies a read address AL. Given the way in which an FIFO functions, this is the address of the location containing the cell in the memory MT which has been waiting longest to be retransmitted on the link lsl. At the same time the FIFO fsl supplies a null level signal on its output fel which signifies that it is not empty. Applied to an inverting input of the read gate pl, this signal enables transmission of a read control signal lec to the buffer memory to command in it the execution of a read operation. The address AL for this operation is that provided by the FIFO fsl on its output sfs, the write/read address multiplexer mel being switched to this output because the signal ecr is absent. The cell which is therefore read is transmitted by the buffer memory MT on the bus bcs. From there, under the control of a clock signal hs, it is written into the register rds of the transmit circuit CTl.

At the same time, the address AL supplied by the output FIFO fsl on its output sfs is supplied to the input of the FIFO fal which also receives a write control signal from the gate pa opened by the null level on the line fvl and therefore passing the signal lec. This address, corresponding to a location being read and therefore being released in the buffer memory MT, is therefore stored in the FIFO fal to be re-used, as already described.

The process that has just been described is reproduced in a similar way in each period tj for the successive output links provided that cells to be retransmitted are supplied by the memory MT.

Consideration will now be given to the case where there is no cell to be retransmitted. Taking up again the example of the link lsl and its output FIFO fsl, there is no longer any address in this FIFO and it therefore supplies a signal fvl indicating that it is empty.

The signal fvl closes the gate pl and therefore prohibits any read operation in the buffer memory MT. It also closes the gate pa and prevents any write operation in the FIFO fal. Also, it is transmitted to the management unit UG to tell it that the switching matrix does not have any cell to transmit on the output link in question. In return the management unit UG supplies on the bus bcs the information that characterizes an empty cell, for example.

Like the bus BE, the bus BS is extended as far as the management unit UG which enables it to transmit service cells on the output links if there is no communication cell to be retransmitted. The empty cell is therefore one of these service cells, so to speak.

The empty cell transmitted by the management unit UG on the bus bcs is routed by the output circuit CTl on the output link lsl in just the same way as a communication cell from the buffer memory MT.

Also, as will be seen later, it is possible for the management unit to force the transmission of a service cell, provided that certain limited additional means are provided.

The various cyclic control signals will be generated by a timebase, as is standard practise in this technique. Their timing is outside the scope of this description. They are shown in FIG. 3. The various components in the FIG. 1 diagram are of conventional types.

Figure 4:
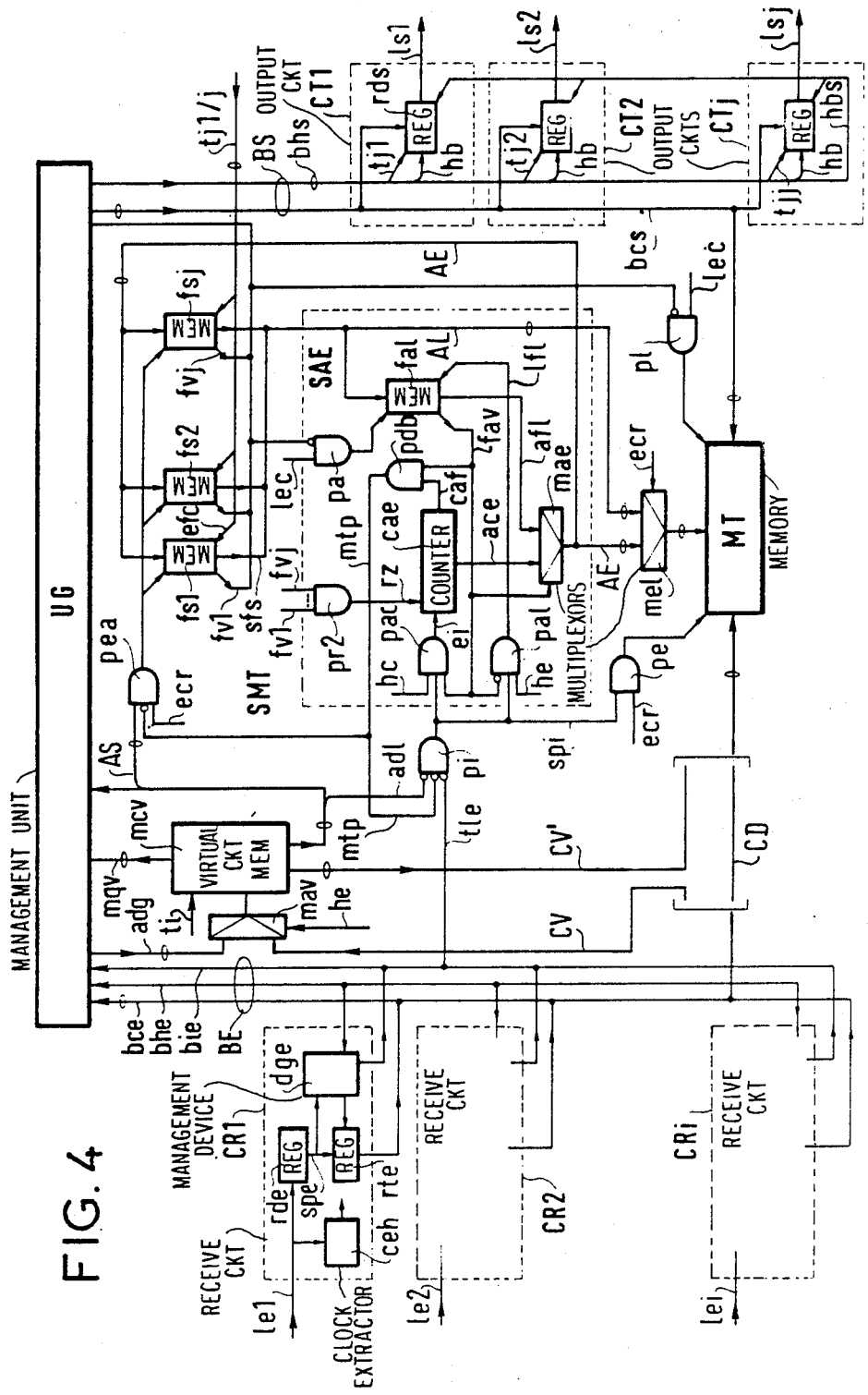

Turning now to FIG. 4, the case of virtual circuit routing will now be considered. In this case, as compared with the format from FIG. 2, the label of each cell comprises only the virtual circuit number CV, the addresses being omitted. The diagram is the same as that of FIG. 1 except as will now be explained and the same references have been retained for designating identical component parts.

The address decoding device is replaced by a virtual circuit memory mcv. The latter, read under the control of the signal ti in each period of the bus BE, then receives as an address the indication CV of the receive cell which is transferred to it by a multiplexer mav switched by the signal he. In exchange it supplies the signal AS if the cell has to be retransmitted or the signal adl if the cell is addressed to the management unit UG, in just the same way as the decoding circuit cda from FIG. 1. Thereafter the procedure is the same in so far as routing of the received cell is concerned.

Moreover, the permutation wiring CPA is omitted because the memory mcv supplies a modified virtual circuit indication CD' instead of that which served it as an address.

The management unit finally accesses the memory mcv via the links adq and mqv to write and read it. This will make it possible to write into it the information corresponding to each value of the indicator CV, in locations corresponding to these values, in order to have the memory mcv function as a translation table.

One embodiment of a management unit in accordance with the present invention will now be described with reference to FIG. 5.

The management unit UG essentially comprises a microprocessor MP, memories MM, an interface unit INT for external access to the microprocessor and a dedicated interface unit FS, all interconnected by a data bus BD and address bus BA. The management unit UG is connected to the switching unit from FIG. 1 or 4 represented at EC. Also included in the management unit UG is the timebase BT supplying the various periodic signals shown in FIG. 3.

The bus bce forming part of the bus BE of the switching unit from FIG. 1 or 4 is connected to a FIFO qme. The line adl is connected to a call circuit consisting of a gate qpe. Opened by the signal he at the beginning of the period ti (see FIG. 3), the gate qpe transmits a call signal provided on the line adl by the switching unit and produces the write control signal spe that initiates writing of a cell then present on the bus bce into the FIFO gme. This process is repeated whenever the switching unit receives a cell addressed to the management unit UG.

As soon as it contains at least one cell, the FIFO gme supplies the signal gmp. This signal is periodically interrogated by the microprocessor MP which supplies on the bus BA a specific address received by an address decoder DA which then supplies the signal adme which opens the gate pdme. The microprocessor MP therefore receives over the data bus BD the information that at least one cell is waiting in the FIFO qme. The microprocessor MP then reads a cell in the FIFO gme. For this purpose it supplies new addresses corresponding to successive parts of the FIFO gme in exchange for which the address decoder DA supplies address signals collectively represented by a read control signal adle. The same collective signal adle applied to a multiplexer gmx enables parts of a cell read in the FIFO gme to be transmitted word by word on the data bus BD. This cell is stored and processed by the microprocessor MP. This process is repeated for as long as the FIFO gme contains a cell supplied by the switching unit.

Generally speaking, gates like the gate pdme enable the microprocessor to take note of states within the management unit UG or the switching unit EC and present on specific lines, for example to monitor the traffic handled or to supervise operation. In particular, the signal tle (see FIG. 1) supplied on the bus bie which is part of the bus BE can be communicated in this way to the microprocessor to inform it of the reception of each empty cell, the signal til/tii simulataneously indicating on which input link it was received.

The output bus BS of the switching unit EC is connected to the output of a multiple OR gate qms the two inputs of which are connected to the outputs of multiple AND gates qps and qpv respectively connected to the outputs of two registers qrs and qrv. Each of these registers is provided to store one cell to be transmitted.

The line fv corresponds to all the lines fvl through fvj in FIG. 1 or 4 on which the output FIFO supply a signal when they do not contain any address of a cell to be retransmitted. A signal on the line fv therefore indicates that the FIFO interrogated during a period tj is empty. It is applied to one input of the gate gpv. Assuming that the latter does not receive any signal from the gate qpl it is then open and passes the cell contained in the register qrv to the output bus BS. This is an empty cell. It may have been written into the register qrv by manual switches or by the microprocessor MP.

On the other hand, if the gate qpl supplies an output signal it is the gate cps which is open and the cell contained in the register qrs which is transmitted. The register grs is loaded directly by the microprocessor MP from the databus BD, word by word, the corresponding addresses adms being received over the address bus BA and decoded by the address decoder DA.

The same register loading process is used by having the microprocessor MP write the identity of an output link into the register gre. This identity is the designation tjl through tjj of the period tj assigned to this output link. A comparator gem receives the signals tjl through tjj supplied by the timebase BT. When the content of the register cre and the signal tjl/j supplied in this way to the comparator are identical the comparator produces a signal gev which opens the gate gpl.

When the microprocessor MP has to send a cell on an output link it prepares the cell in the register grs and the destination address in the register gre. If transmission of this cell does have priority over the traffic handled by the switching unit EC the microprocessor commands transmission of the cell by activating a flip-flop gbe. To do this it has only to supply a corresponding address which, decoded by the address decoder DA, will supply a signal agbe applied to the input S of the flip-flop gbe. Before this the microprocessor MP will read the state of this flip-flop qbe through a gate pgbe opened by an address bgbe and connected to the Q output of the flip-flop gbe in order to verify whether there is already a cell awaiting transmission. The same Q output is connected to the D input of a D-type flip-flop gce the Q output of which is connected to the D input of a second D-type flip-flop gde. The C inputs of the two flip-flops receive the signal he. They are therefore activated one after the other and the gate pqe finally supplies a signal sge which opens the gate gpl. This will happen when, as already explained, the comparator gem supplies the signal qev indicating that, in the output link addressing cycle, the address designated by the content of the register qre has been reached and when the signal fv is supplied by the switching unit EC indicating that no cell is to be retransmitted on the output link in question. The cell contained in the register grs will therefore be transmitted on the bus bcs instead of an empty cell. Furthermore, the output signal of the gate gpl connected to the R input of the flip-flop gbe resets the latter to the initial condition and the flip-flops gce and gde also revert to the initial condition after two pulses he.

However, it may also be necessary to be able to transmit urgent messages as a matter of priority. There will be described hereinafter means provided in accordance with the invention for achieving this and which comprise, as will be explained, a minimal modification to the switching unit EC as described with reference to FIGS. 1 and 4.

If transmission of the cells in question takes priority, before activating the flip-flop qbe the microprocessor MP activates a flip-flop gbf by supplying the address agbf.

In this case it is not necessary to wait for the switching unit to signal the absence of any cell to retransmit on the line fv. The signal sbf from the Q output of the flip-flop gbf produces the same effect via the OR gate gfe in conjunction with the signals gev and sge, which effect is to open the gate cpl. The cell contained in the register qrs is therefore transmitted on the bus BS in the first period assigned to the output link whose identity is contained in the register gre. The output signal from the gate qpl is also transmitted on a line fcv to gates ifv added to the switching unit EC and which, by means of the signal fcv, make it possible to block transmission of the signals tjl/j to the read control inputs lfc of the output FIFO fsl through fsj. The same signal fcv closes the gate pl by means of an additional input thereof. This prevents the read operations in the output FIFO and the buffer memory MT in order to provide space for transmitting the cells provided the management unit UG. Reinitialization of the flip-flop gbf over the line bgbf may originate directly from the line fcv, in just the same way as for the flip-flop gbe, or from the microprocessor MP, by means of an appropriate address.

Figure 5:
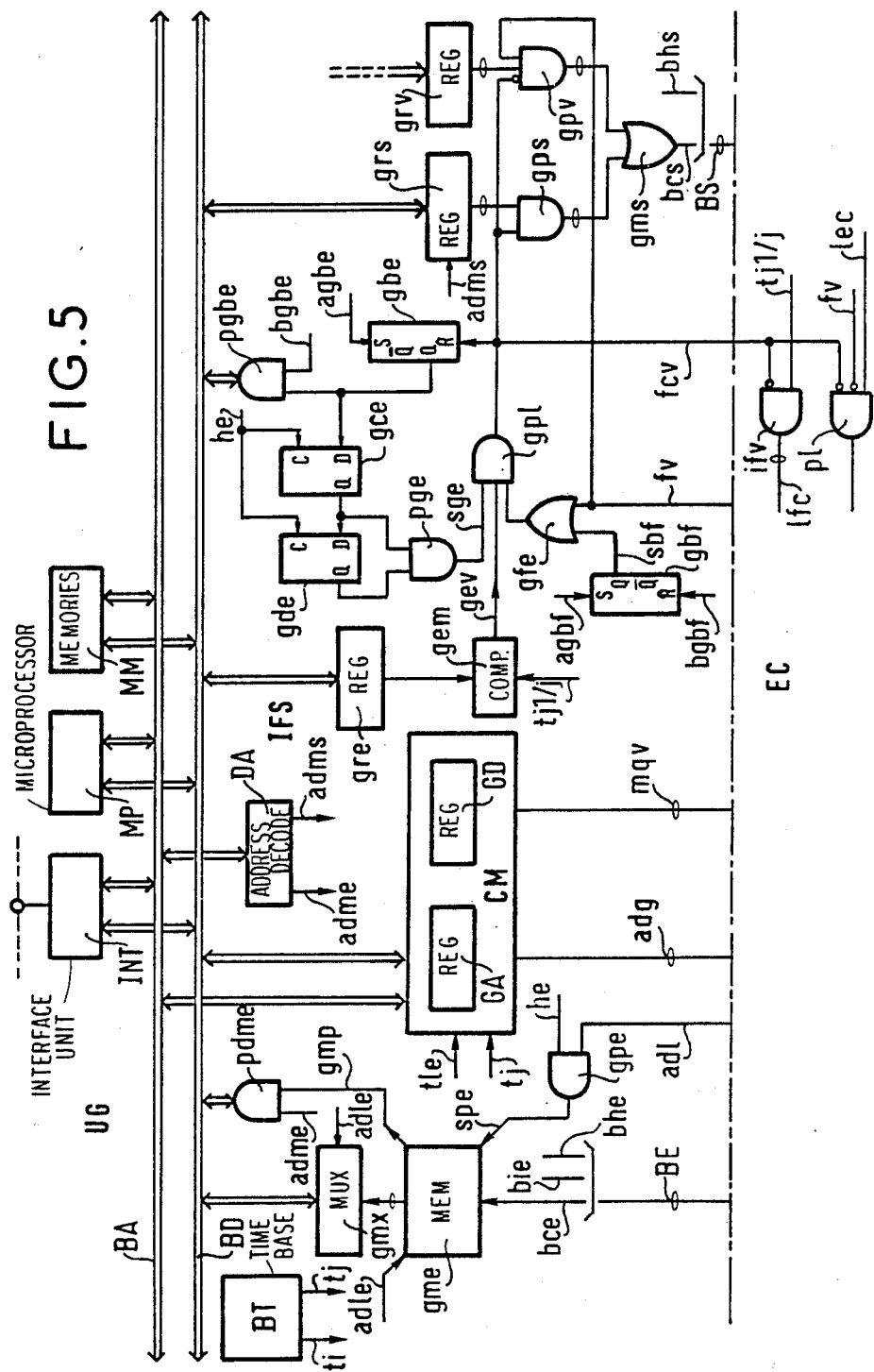

Finally, FIG. 5 shows a device CM connected to the buses BA and BD and including an address register GA and a data register GD. The device CM is connected by links adg and mqv to the virtual circuit memory included in the switching unit of FIG. 4. It is used to read and write in this memory in the conventional way information relating to the virtual circuits, as previously defined. No detailed description of it will be given since its implementation depends on the type of memory used for the virtual circuit memory. However, the functioning of the device CM may be conditioned by the signals tle and tj which are supplied to it so that it functions in the periods where no cell received is supplied to the switching unit EC or in the time periods reserved for transmission operations, so that the changes in the content of the virtual circuit memory do not interfere with normal use of this memory in the routing of received cells. The address register GA is used to receive the address supplied by the microprocessor in the virtual circuit memory where the microprocessor has to read or write routing data; this data passes through the register GD.

The management unit that has just been described connected to the input bus BE and the output bus BS actually communicates directly with the input circuits and the output circuits of the switching unit. It is not dependent on correct functioning of the switching circuits of the switching unit. It receives the cells which are addressed to it as soon as they appear on the bus BE provided that an output adl of the decoding circuit cda (FIGS. 1 and 4) supplies, as it must, a call signal; this circuit is very simple and the probability that it will fail is very low. It can transmit cells directly on the bus BS to the receive circuits when the traffic requires it (empty cell) or permits it (non-priority service cell) or irrespective of the circumstances (priority cell). These arrangements therefore confer considerable security with respect to the transmission capabilites offered to the management unit.

Also, it has been noted that empty cells are always present in the switched data streams. As a management unit of this kind is associated with each switching unit the management units of an entire switching network are thus provided, so to speak, with specific transmission capacity enabling them to exchange large volumes of information without this affecting the transmission capacity available for calls. This also makes it possible to envisage a decentralized network control system part at least of which can be shared between the management units. In this connection the management units could receive more information from the switching units than has been described here. For example, the output FIFO could individually supply an indication of how full they are, enabling the management unit to evaluate the load on each associated output link. Every call through a switching network made up of switching units of this kind could then begin with the transmission of a service cell retransmitted from management unit to management unit and making it possible to verify that the new call will not cause any congestion anywhere in the network.

It is obvious that the foregoing description has been given by way of non-limiting example only and that numerous variations thereon may be envisaged without departing from the scope of the invention.

I claim:

1. A management unit for a switching unit for switching data transmitted by asynchronous time-division multiplexing, said switching unit comprising receive circuits each associated with an input link and supplying on an input bus cells received via said input link, transmit circuits each associated with an output link and sending cells on said output link which are supplied to it by an output bus and a buffer memory system for transferring cells selectively from the receive circuits to the transmit circuits and to this end connected between the input and output buses, said management unit being characterized in that it comprises input means arranged to receive cells present on said input bus and output means for supplying cells on said output bus, in both cases under the control of said buffer memory system, and wherein said input bus and said output bus are the only communicating means between said input means and said output means and said buffer memory.

2. A management unit according to claim 1 characterized in that said input means comprise a call circuit for detecting a call signal from the buffer memory system and an input memory, the call circuit commanding writing of the cell present on the input bus of the switching unit into the input memory of the management unit when it receives said call signal.

3. A management unit according to claim 2 characterized in that said input memory is a FIFO memory capable of storing a plurality of cells.

4. A management unit according to any of claims 1 through 3, wherein said switching unit includes means for providing an availability signal indicating the absence in said buffer memory system of any cell to transmit, said management unit being characterized in that said output means comprises a transmit circuit receiving said availability signal and an output register, the transmit circuit determining transmission of the cell that the output register contains on the output bus of the switching unit immediately upon receiving said availability signal.

5. A management unit according to claim 4 characterized in that said output register comprises at least one register for a cell to be transmitted and an empty cell register, the cell contained in the empty cell register being transmitted on said output bus whenever there is no cell to be transmitted in the register for cells to be transmitted.

6. A management unit according to claim 5 characterized in that it further comprises a forcing circuit supplying a signal having the same effect as said availability signal and in that said transmit circuit also supplies a forcing signal having the same effect in the switching unit as said availability signal.

7. A management unit according to claim 1 wherein said buffer memory system includes a virtual circuit memory, said management unit being further characterized in that it further comprises means for writing data to said virtual circuit memory and for reading data from said virtual circuit memory.

* * * * *